Nov. 8, 1960     A. E. KEESE     2,959,427
DRAWBAR
Filed May 1, 1959     2 Sheets-Sheet 1
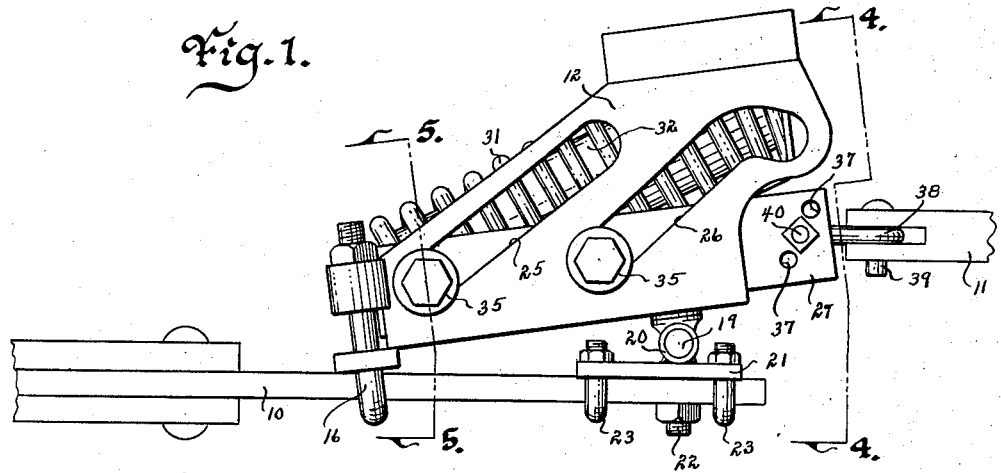
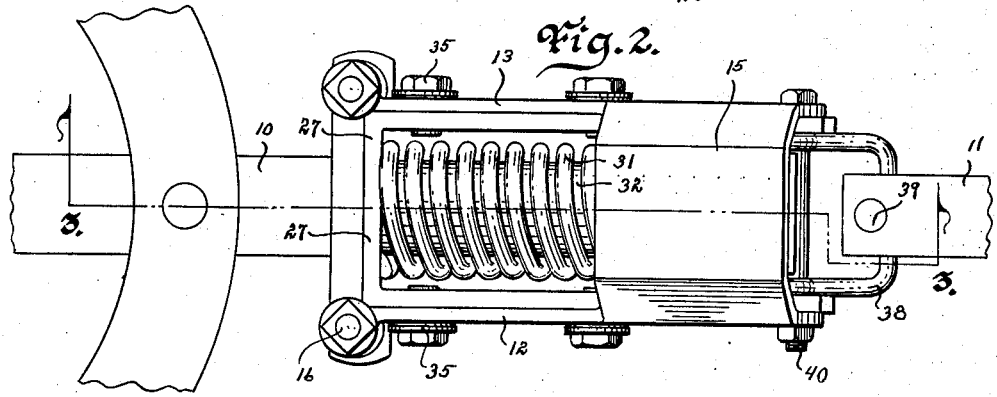
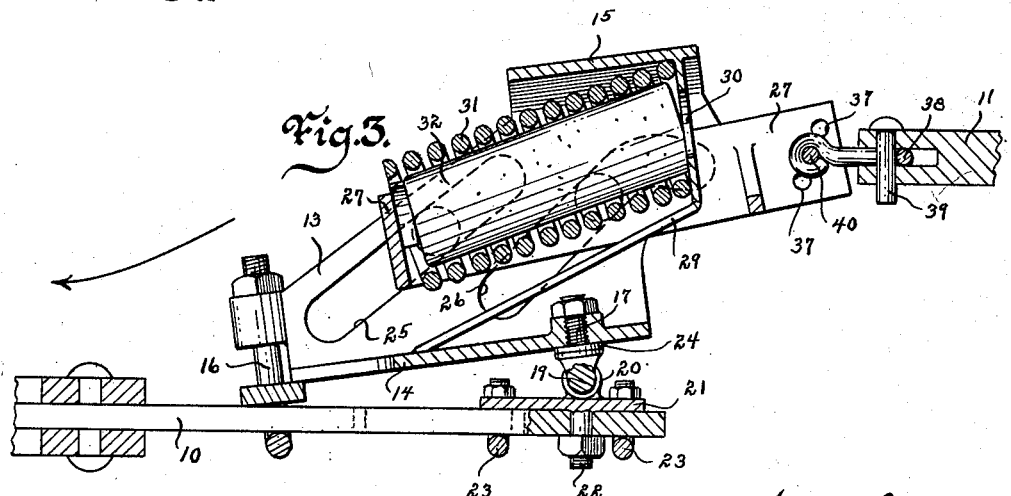
Witness
Edward P. Seely
Inventor
Alfred E. Keese
by M. Talbert Dick
Attorney

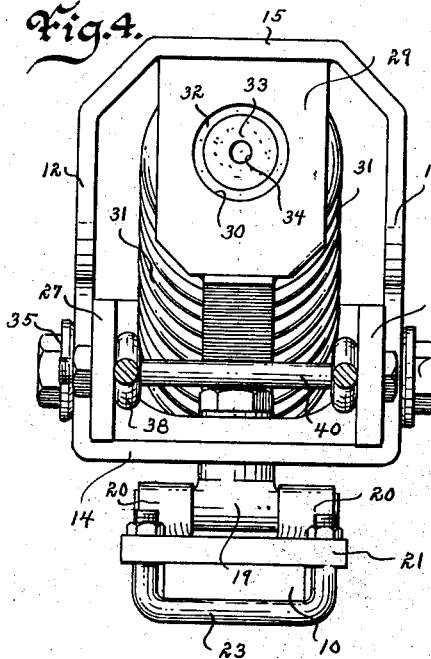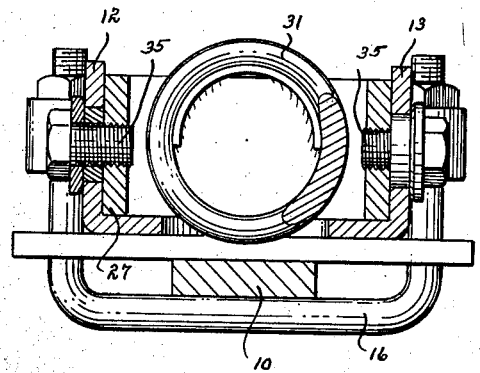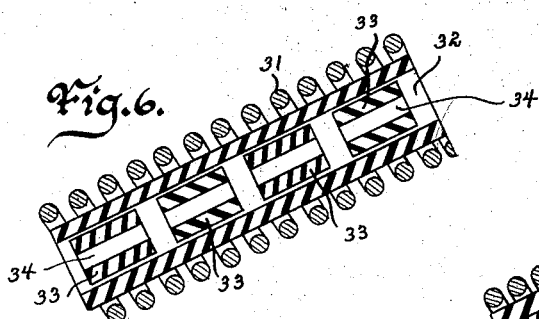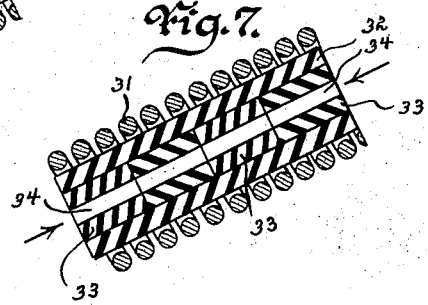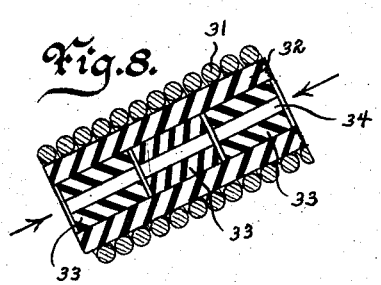

United States Patent Office 2,959,427
Patented Nov. 8, 1960

2,959,427

DRAWBAR

Alfred E. Keese, Kellogg, Iowa (R.R. 3, Grinnell, Iowa)

Filed May 1, 1959, Ser. No. 810,306

14 Claims. (Cl. 280—405)

This invention relates to a drawbar for tractors and the like and more particularly to one that will initially automatically rise relative to the tractor when subjected to initial heavy pull loads.

The use of drawbars on pulling vehicles such as tractors, and the like, is old. Most such drawbars consist of a horizontally hinged bar onto which the vehicle to be pulled is secured. Such drawbars are not entirely satisfactory under all conditions of usage. One fault is that they do not compensate for the downward movement of the rear end of the tractor at the initial start of a heavy load. The reasons for this lowering of the rear end of the tractor are wheel tire flattening, tire tread penetration into the ground, and the tendency for the front end of the tractor to rise. Obviously, this action on the part of the tractor makes even more difficult the starting of a heavy pull load.

Therefore, one of the principal objects of my invention is to provide a drawbar for tractors and like that will automatically compensate for the lowering of the rear end of the tractor at the start of a heavy pull load.

A further object of this invention is to provide a vertical compensating drawbar that may be easily and quickly adjusted as to the degree of compensation.

A still further object of this invention is to provide a vertical compensating drawbar that is light of weight.

A still further object of my invention is to provide an automatic drawbar of few parts that may be easily installed on a tractor.

Still further objects of this invention are to provide a compensating drawbar that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a side view of my hitch installed and in use;

Fig. 2 is a top view of the device;

Fig. 3 is a longitudinal sectional view of the hitch taken on line 3—3 of Fig. 2 and more fully illustrates its construction;

Fig. 4 is a rear view of the device taken from line 4—4 of Fig. 1;

Fig. 5 is a cross-sectional view of the device taken on line 5—5 of Fig. 1;

Fig. 6 is a longitudinal sectional view of the resilient portion of the device and shows the same in expanded condition;

Fig. 7 is a longitudinal sectional view of the resilient elements in contracted condition; and Fig. 8 is a longitudinal sectional view of a portion of the coil spring with the number of resilient blocks reduced.

In these drawings I have used the numeral 10 to designate the drawbar or like of a pulling vehicle such as a tractor. The numeral 11 designates the tongue or like of the implement or vehicle being pulled. My hitch connects these two members and I will now describe it in detail. The base portion of my device is a housing having the two sides 12 and 13, a bottom 14, and a top member 15. This housing is detachably secured to the drawbar 10 by any suitable means. I show a U-bolt 16 vertically slidably secured to the forward end of the housing and which is adapted to extend around the length of the drawbar in longitudinal adjustable condition as shown in Fig. 1. The numeral 17 designates a bolt means extending through the rear area of the bottom 14 and carrying a horizontal shaft 19 at its bottom. This shaft 19 has its two ends rotatably embraced by bearings 20 which in turn are secured to a plate 21. This plate 21 has a bolt means 22 detachably selectively extending through one of the holes in the drawbar as shown in Fig. 3. U-bolts 23, associated with the plate, detachably clamp around the rear end area of the drawbar. By this arrangement the housing is longitudinally adjustably detachably connected to the drawbar. Its rear end may be lowered or raised by removing or adding washers or like 24, under the plate or between the shaft portion and under side of the bottom of the housing, or by placing build-ups under the forward end of the housing. This permits vertical angular adjustment of the housing.

In each side 12 and 13 I have two cam slots 25 and 26 extending upwardly and rearwardly as shown in Fig. 1. The slot 26 has its upper end curved to extend substantially horizontally rearwardly. The numeral 27 designates a rearwardly extending U-shaped block member slidably mounted in the housing and having its two rear ends extending out of the rear end of the housing. The numeral 29 designates a back wall at the vertical center of the housing with its length extending between the two rearwardly extending arms of the member 27 as shown in Fig. 4. An opening 30 is provided in this wall. The numeral 31 designates a coil spring having its forward end engaging the inside forward portion of the U-member 27 and its rear end engaging the inner side of the wall 29. By this arrangement the spring 31 will yieldingly hold the U-shaped block member 27 in its forward sliding movement within the housing. In the coil spring 31 I have a flexible resilient tube 32 of rubber or like material having an outside diameter greater than that of the diameter of the hole 30, but an inside diameter less than that of the hole 30. Into the tube I selectively insert tubular blocks 33 of flexible resilient material such as rubber or like. Obviously the greater the number of these blocks 30 the greater the force needed to compress the unit made up of the tube 32 and blocks 33. Thus by selection of the number of blocks used, the yielding phase of the device is adjustably obtained. The detachable blocks 33 may be inserted through or withdrawn through the hole 30. To facilitate the handling of the blocks, I provide each with a core hole 34 into which a tool may be inserted. The members 31, 32 and 33 comprise the means for yieldingly holding the U-block member 27 in its forward sliding movement. Into each slot 25 and 26 I extend a bearing screw 35 and which is threaded into the adjacent part of the U-block member 27. The outer flange 36 of each of these bearing screws has a diameter greater than that of the width of the slot through which it slidably passes and its inner side wall is convex beveled as shown in Fig. 4, so as to not bind on the outer side of the housing. In the rear end portion of each arm of the U-block member 27 is a substantially vertical row of holes 37. The numeral 38 designates a U-shaped clevis embracing the pin 39 of the tongue 11. The numeral 40 designates the clevis bolt pin that detachably selectively extends through holes in the rear end arms of the U-block 27 and through the free ends of the clevis as shown in Fig. 2. By this arrangement of parts, when the pulling vehicle moves away from the pulled vehicle and especially during the initial forward movement, the U-block member 27 will slide rearwardly in the housing and against the resiliency of the coil spring and rubber like elements within the coil spring. However, any rear movement of the U-block member relative to the housing must be in conformity with and to the upwardly and rearwardly extending cam slots 25 and 26 by virtue of the bearing screws of the U-block member slidably extending through these slots. Therefore, as the U-block member moves rearwardly in the housing it will also move progressively upwardly. This action will automatically compensate for the lowering of the rear end of the tractor under pulling load. Different conditions may require different normal set vertical positions of the tongue 11 and this may be adjustably had by the selection of the clevis holes in the rear end portion of the U-block member 27. Also a different yieldable resistance may be desirable under various pulling conditions and as herebefore noted this is adjustably accomplished by adding or removing block members 33. The tilting of the housing increases or decreases angle of inclines to offer greater or lesser resistance. By having the upper end of the slot curved to extend rearwardly, the movable mechanism will recede and tend to stabilize as it approaches its upper maximum movement.

Some changes may be made in the construction and arrangement of my drawbar without departing from the real spirit and purpose of my invention, and it is my intention to cover by my claims, any modified forms of structure or use of mechanical equivalents which may be reasonably included within their scope.

I claim:

1. In combination, a drawbar, a tongue, a housing secured to said drawbar, a movable member slidably mounted in said housing and secured to said tongue; said housing having two sides, a slot in each of the two sides of said housing and extending upwardly and rearwardly from the direction of said drawbar, a bearing projection extending through each of said slots connected to said movable member, and resilient means for yieldingly holding said movable member toward said drawbar.

2. In combination, a drawbar, a tongue, a housing secured to said drawbar, a movable member slidably mounted in said housing and secured to said tongue; said housing having two sides, a slot in each of the two sides of said housing and extending upwardly and rearwardly from the direction of said drawbar, a bearing projection extending through each of said slots connected to said movable member, and an adjustable resilient means for yieldingly holding said movable member toward said drawbar.

3. In combination, a drawbar, a tongue, a housing secured to said drawbar, a movable member slidably mounted in said housing and secured to said tongue; said housing having two sides, two spaced apart slots in each of the two sides of said housing and extending upwardly and rearwardly from the direction of said drawbar, a bearing projection extending through each of said slots connected to said movable member, and resilient means for yieldingly holding said movable member toward said drawbar.

4. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, and means for securing its two rear end portions of said U-shaped member to said tongue.

5. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, a flexible resilient cylindrical member in said coil spring, and means for securing its two rear end portions of said U-shaped member to said tongue.

6. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, a flexible resilient cylindrical member in said coil spring, a plurality of removable flexible resilient block members inside said cylindrical member, and means for securing its two rear end portions of said U-shaped member to said tongue.

7. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, a flexible resilient cylindrical member in said coil spring, a plurality of removable flexible resilient block members inside said cylindrical member; said rear wall portion having an opening through which said block members can pass, and means for securing its two rear end portions of said U-shaped member to said tongue.

8. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion; said two end portions of said U-shaped member each having a row of holes, and a clevis connection selectively engaging a hole in each of the two end portions of said U-shaped member and operatively secured to said tongue.

9. In combination, a drawbar, a tongue, a housing secured to said drawbar, a movable U-shaped member slidably mounted in said housing and having its two end portions extending from the rear of said housing and in a direction away from said drawbar; said housing having two sides, slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, a flexible resilient cylindrical member in said coil spring, a plurality of removable flexible resilient block members inside said cylindrical member; said rear wall portion having an opening through which said block members can pass, and means for securing its two rear end portions of said U-shaped member to said tongue; each of said block members having a core hole for the insertion of a handling tool.

10. In combination, a drawbar, a tongue, a housing secured to said drawbar, a movable member slidably mounted in said housing and secured to said tongue; said housing having two sides, a slot in each of the two sides of said housing and extending first upwardly and rearwardly from the direction of said drawbar and then substantially horizontally and rearwardly, a bearing projection extending through each of said slots connected to said movable member, and resilient means for yieldingly holding said movable member toward said drawbar.

11. In combination, a drawbar, a tongue, a housing secured to said drawbar, a movable member slidably mounted in said housing and secured to said tongue; said housing having two sides, a slot in each of the two sides of said housing and extending first upwardly and rearwardly from the direction of said drawbar and then substantially horizontally and rearwardly, a bearing projection extending through each of said slots connected to said movable member, and an adjustable resilient means for yieldingly holding said movable member toward said drawbar.

12. In combination, a drawbar, a tongue, a housing secured to said drawbar, a movable U-shaped member slidably mounted in said housing and having its two end portions extending from the rear of said housing and in a direction away from said drawbar; said housing having two sides, two spaced apart slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, and means for securing its two rear end portions of said U-shaped member to said tongue; the rearmost slot in each side of said housing having its upper end area extending rearwardly and horizontally.

13. In combination, a drawbar, a tongue, a housing secured to said drawbar, a movable U-shaped member slidably mounted in said housing and having its two end portions extending from the rear of said housing and in a direction away from said drawbar; said housing having two sides, two spaced apart slots in each of the two sides of said housing extending rearwardly and upwardly in a direction away from said drawbar, a lug bearing member extending through each of said slots and secured to said U-shaped member, a rear wall portion on said housing, a coil spring having its forward end engaging the inside forward portion of said U-shaped member and its other end engaging said rear wall portion, a flexible resilient cylindrical member in said coil spring, a plurality of removable flexible resilient block members inside said cylindrical member; said rear wall portion having an opening through which said block members can pass, and means for securing its two rear end portions of said U-shaped members to said tongue; each of said block members having a core hole for the insertion of a handling tool; the rearmost slot in each side of said housing having its upper end area extending rearwardly and horizontally.

14. In combination, a drawbar, a tongue, a housing secured to said drawbar, a movable member slidably mounted in said housing and secured to said tongue; said housing having two sides, each having a slot extending upwardly at an angle to the vertical, a bearing projection extending through each of said slots connected to said movable member, and an adjustable resilient means for yieldingly holding said movable member toward said drawbar.

References Cited in the file of this patent

UNITED STATES PATENTS

| | | |
|---|---|---|
| 92,182 | Gardiner | July 6, 1869 |
| 1,940,061 | Paul | Dec. 19, 1933 |
| 1,990,328 | Jett | Feb. 5, 1935 |
| 2,155,715 | Knapp | Apr. 25, 1939 |
| 2,625,089 | Pursche | Jan. 13, 1953 |